X 1395
X 1155

Sept. 11, 1956 B. WISE 2,762,918

HIGH GAIN FREQUENCY MULTIPLIERS

Filed March 31, 1954 3 Sheets-Sheet 1

FREQ. MULTIP... IN WHICH T... INPUT CKT. PR... SENTS MAX IMPEDANCE ... GIVEN FRE... AND ALSO ... ANOTHER FR... IN THE VICIN... OF THE MULT... OF THE GIV... FREQ. TO WH... MULTIPLE TH... OUTPUT CKT TUNED, PROV... INCREASED POWER GAIN

INVENTOR.
BERNARD WISE
BY Charles H. Brown
ATTORNEY

HIGH GAIN FREQUENCY MULTIPLIERS

Filed March 31, 1954 3 Sheets-Sheet 2

FREQ. DOUBLER USING CAVITY RESONATOR

INVENTOR.
BERNARD WISE
BY Charles H. Brown
ATTORNEY

HIGH GAIN FREQUENCY MULTIPLIERS

Filed March 31, 1954 3 Sheets-Sheet 3

INVENTOR.
BERNARD WISE
BY Charles H. Brown
ATTORNEY

United States Patent Office 2,762,918 Patented Sept. 11, 1956

2,762,918

HIGH GAIN FREQUENCY MULTIPLIERS

Bernard Wise, Philadelphia, Pa., assignor to Radio Corporation of America, a corporation of Delaware Application March 31, 1954, Serial No. 420,036

15 Claims. (Cl. 250—36)

The invention relates to frequency multipliers, and it particularly pertains to means for increasing the power gain of such multipliers.

Frequency multiplying arrangements are known in the art. Perhaps the most common form is that in which the non-linear relationship which exists between the grid voltage and anode current, or the non-linear relationship between the grid voltage and the grid current, of a vacuum tube is used to produce output currents which include components of the desired frequency. These components are selected by some suitable means, such as a sharply tuned filter. A class C amplifier may be used as a frequency multiplier by tuning the output circuit to a multiple of the frequency of the driving source. As the output frequency is increased, the output power will decrease at a rate greater than the rate of frequency increase. Also, the grid driving losses tend to increase with the degree of multiplication because an increasingly higher bias is required to decrease the width of the plate current pulse as the ratio of output to input frequency is increased. The only known alternative is to reduce the bias, letting the current flow through a larger portion of the tube operating cycle, and operate the tube at lower anode efficiency. Usually, this requires a reduction in amplifier output to prevent excessive anode dissipation. The disadvantage is so great that it is usually considered more economical to use two known frequency doubling circuits rather than a single frequency quadrupling circuit, and so on.

An object of the invention is to improve the power gain of frequency multiplier circuit arrangements.

Another object is to decrease the losses which occur within the vacuum tube and the associated circuitry of the frequency multiplier and which limit the output power, so that greater output power is realized than is now obtainable with arrangements of the known art.

A further object of the invention is to provide an improved frequency multiplier circuit structural arrangement.

The objects of the invention are obtained in a frequency multiplying circuit arrangement including an electron discharge device having at least electron emissive, electron control, and electron collecting electrodes determining input and output terminals, an input circuit coupled to the input terminals comprising the electron emissive and electron control electrodes and to which a wave of given input frequency is applied, an output circuit coupled to the output terminals comprising the electron collecting electrode and one other electrode and from which circuit there is derived an output wave of frequency equal to an integral multiple of the given input frequency. According to the invention, the input circuit comprises resonator elements of value at which the impedance presented across the input electrodes is a maximum at the given frequency and also at another frequency in the vicinity of the multiple of the given frequency, to which multiple the output circuit is tuned. The input circuit may be a cavity resonator structure, a tuned transmission line structure, or a lumped-constant circuit, a portion, or what might be termed subcircuitry, of which is arranged to present parallel resonance at a frequency higher than the given input frequency in order to effect a high impedance across the input circuit as a whole at a frequency greater than the input frequency and equal or close to the output frequency, as well as operating in conjunction with the other components of the input circuit to establish parallel resonance and the attendant high impedance across the input circuit at the given input frequency. In such an arrangement the high impedance at the given frequency serves exactly as in the prior art arrangements. The high impedance at the output frequency, which is not provided for in the prior art arrangements, together with the coupling between the output and input circuits inherently provided by the interelectrode capacitances and the electron flow between the electrodes, provides a path for energy flow in support of the generation of the harmonic wave at the desired output frequency. According to the invention, in order to obtain regeneration rather than degeneration, the resulting circuit reactance across the entire input circuit is made capacitive for a grounded-grid multiplier and inductive for a grounded-cathode multiplier at the output frequency, while the resonance is established at the input frequency.

The above-mentioned subcircuitry might be arranged so that the input circuit is parallel resonant to provide maximum impedance at the output frequency, except that oscillation at the output frequency will then be established. In a structure involving a grounded-grid amplifier, it has been found that the desired results are obtained when the input circuit is made parallel resonant at a frequency near the output frequency but lying between the input frequency and the output frequency. In practice, the input circuit of a grounded-grid stage is made parallel resonant at the input frequency and also at a frequency lying between 4% and 12% lower than the output frequency. For the grounded-cathode arrangement the sub-circuit is made resonant within a similar range above the output frequency.

The circuit arrangement according to the invention may be obtained by the use of electron discharge tubes and the like of substantially all types of construction and resonant circuitry comprising reactance elements of the lumped parameter type, transmission line elements, or cavity resonator elements. In a grounded-grid cavity resonator arrangement the desired effect is obtained by sub-circuitry comprising variations of the structure as determined for a given mode to propagate another mode, effecting a series inductance element between the electron emissive electrode and the effective impedance element of the cavity resonator.

In order that the invention may be clearly understood and readily put to practical use, descriptions of several embodiments, given by way of example only, appear below with reference to the accompanying drawings in which.

Figures 1, 2, 3, 4, 5, 11:
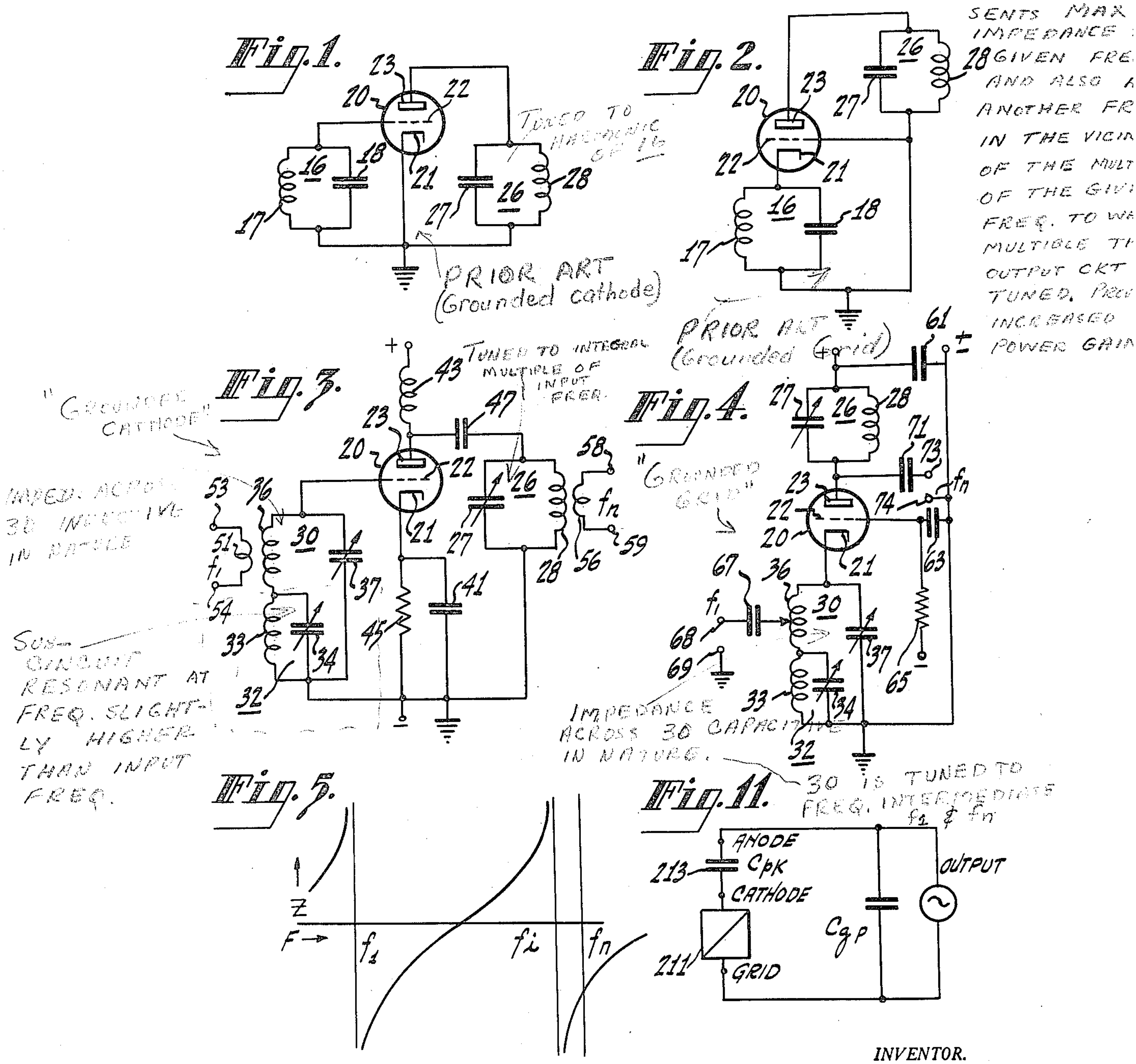
Fig. 1 is a schematic diagram of a prior art grounded-cathode frequency multiplying circuit arrangement.
Fig. 2 is a schematic diagram of a prior art grounded-grid frequency multiplying circuit arrangement.
Fig. 3 is a schematic diagram of a grounded-cathode frequency multiplying circuit arrangement according to the invention.
Fig. 4 is a schematic diagram of a grounded-grid frequency multiplying circuit arrangement according to the invention.
Fig. 5 is a graphical representation of the frequency response of the input circuit of a grounded-grid frequency multiplying circuit arrangement according to the invention.
Fig. 11 is an approximate equivalent circuit diagram showing the feedback path of the arrangement illustrated in Fig. 4.

Referring to Fig. 1, there is shown the fundamental circuitry of a frequency multiplier known to the prior art. An input resonant circuit 16 comprising the parallel connected inductance element 17 and capacitance element 18 provides a high impedance for an input wave of given frequency and is connected between the input electrodes 21 and 22 of a vacuum tube 20 or other electron discharge device comprising an electron emissive or cathode electrode 21, a control grid electrode 22, and an electron collecting or anode electrode 23. An output circuit 26 comprising the parallel connected capacitance element 27 and inductive element 28 is connected between the anode 23 and the cathode 21. The connections shown and described are made with respect to alternating current, it being understood that the necessary power supply and other direct current connections are not shown in the figure. The output circuit 26 is tuned to a frequency equal to an integral multiple of the given frequency to which the circuit 16 is tuned. In practice, it is necessary in most cases to restrict the tuning of the output circuit 26 to a frequency which is two or three times the input or given frequency, although in some instances an output frequency four or more times the input frequency has been developed. In the past, it has been considered that the use of two frequency multipliers of the type shown in Fig. 1 coupled in cascade, in order to produce frequency quadruplication or quintuplication, is desirable, because the magnitude of output from the prior art frequency multipliers is so limited.

The arrangement shown in Fig. 2 is known as the "grounded-grid" circuit because the input circuit 16 is connected between the cathode 21 and a point of fixed R. F. reference potential, which is usually ground, while the output circuit 26 is connected between the anode 23 and the grid 22, which is connected for alternating current to the reference potential point or ground. The grounded-grid circuit is very stable in operation, although it requires a bit more driving power; otherwise, the same disadvantages and limitations apply to the grounded-grid circuit of Fig. 2 as were described in connection with the grounded cathode multiplier circuit shown in Fig. 1. In general, the principal objection to the frequency multiplying arrangements shown in these figures is that the maximum power gain obtainable with these circuit arrangements is rather low, especially at the ultra high frequencies.

An example of a circuit arrangement according to the invention, which will provide higher power gain, is shown in Fig. 3. In this arrangement, the tube 20 and the output circuit 26 are essentially as described above in connection with the prior art circuit arrangements. An input circuit 30 includes sub-circuitry 32 comprising an inductive element 33 and a capacitive element 34 having values at which the sub-circuitry itself is parallel resonant to a frequency slightly higher than the input frequency but which, together with a further inductive element 36 and a further capacitive element 37 having values at which the input circuit as a whole is parallel resonant at the input frequency, present a high impedance across the input circuit 30 as a whole at the output frequency, as well. The cathode 21 is effectively connected to ground by means of a capacitor 41 which offers a low impedance to energy at both the input and output frequencies. Direct operating potentials are applied to the circuit by way of a radio-frequency choke 43 connected to the anode 23 and a cathode bias resistor 45. A blocking capacitor 47 is interposed between the anode 23 and the output circuit 26 to prevent the flow of direct current in the latter circuit. The circuit as shown is the well-known shunt fed, self-biased circuit; however, fixed biasing can be used if desired, according to the known art. The input wave of fundamental frequency $f_1$ is induced in the input circuit 30 by means of the link coil 51 connected to the terminals 53 and 54. The output wave of frequency $f_n$ is obtained from the output circuit 26 by means of a similar inductively coupled link 56 connected to output terminals 58 and 59. Obviously, other known methods of introducing the fundamental wave energy into the input circuit 30, and deriving the output wave from the output circuit 26, can be used.

The application of the input circuit according to the invention to a grounded-grid circuit, is shown in Fig. 4. The output circuit 26 is connected between the anode 23 of the tube 20 and a point of fixed reference potential, preferably ground, by means of a bypass capacitor 61, in the series-fed arrangement as shown. The capacitor 61 would be obviated if the shunt fed circuit as shown in Fig. 3 were used. The input circuit 30 is connected between the cathode 21 and the point of fixed reference potential. The grid 22 of tube 20 is connected to the reference potential point or ground by means of a grounding capacitor 63 and biased to the proper extent by means of a shunt bias applied by way of the grid resistor 65. The grid 22 may be grounded directly if self-biased, for example in the manner shown in the circuit of Fig. 3. Energy at the input frequency is applied to the input circuit 30 by way of a coupling capacitor 67 which is tapped onto the further inductance element 36 and connected to the input terminal 68, the other input terminal 69 being connected to the reference potential point or ground. The output wave of frequency $f_n$ is obtained from the anode 23 by way of the coupling capacitor 71 leading to a live output terminal 73. The other output terminal 74 is connected to the reference potential, shown here as ground. In the circuit arrangements of Fig. 3 and Fig. 4 a certain amount of energy is coupled from the output circuit 26 to the input circuit 30 by way of the tube 20. Part of this coupling is due to the inter-electrode capacities and part of it is due to the inherent coupling by the flow of electrons from the cathode 21 to the anode 23. Even the grounded-grid circuit, which is designed to isolate the input and output circuits as much as possible, exhibits this inherent coupling. By arranging the input circuit 30, in this instance by means of the sub-circuitry 32, to present a high impedance capacitive in nature to energy at the output frequency, regenerative feedback will be developed at the output frequency which will increase the output power. The overall input circuit 30 is, of course, also parallel resonant at exactly the input frequency $f_1$. In Fig. 5 there is shown a graphical representation of the impedance across the entire input circuit with respect to frequency of the circuit of Fig. 4. At the input frequency $f_1$ the parallel resonance of the circuit 30 provides a very high impedance, infinite impedance in the ideal case, and due to the two-pole network shown, parallel resonance is again obtained at a higher frequency $f_i$. The frequency $f_i$ cannot be equal to the output frequency because detrimental oscillations would then occur at the output frequency. The input circuit 30 is, therefore, made parallel resonant to a frequency $f_i$ which is somewhat different from the output frequency $f_n$. In practice, the intermediate frequency $f_i$ for a grounded-grid amplifier should lie between 4% and 12% lower than the output frequency and about the same amount higher for the grounded-cathode circuit. The impedance across the circuit 30 at the frequency $f_n$ is still very high, as is shown in Fig. 5, and it is capacitive in nature. From this curve, it is seen that the input circuit 30 is a two-pole network parallel resonant at the input and intermediate frequencies. Another factor to be considered is the effect of phase shift, which is inherent in all tuned circuits of this type. The spread between the intermediate and output frequencies can be adjusted not only to provide high impedance at the output frequency and capacitive reactance at the output frequency in circuit 30, but also to provide a phase shift which is more favorable to the desired condition of operation.

Transmission line elements and cavity resonator circuitry may be substituted for the lumped reactance type of circuitry shown in the diagrams. Figs. 6–9 show a frequency doubler using cavity resonator circuitry along the lines taught by the applicant's copending U. S. patent application Ser. No. 322,909, filed November 28, 1952. According to the teachings in the copending patent application, and in accordance with the present invention, frequency multiplication may be obtained in the arrangement shown in Figs. 6–9 comprising an electron discharge device or vacuum tube 111 having an anode terminal 113, a control grid terminal 115 and a cathode terminal 117. The cavity resonator structure includes tuned input and output cavity resonators for the vacuum tube discharge device 111. As shown, both the input and output cavities are rectangular in shape with the vacuum discharge device 111 extending through registered apertures in the cavity walls centrally of each cavity. These two cavities are preferably defined by three flat walls. The input cavity 121 is contained between a first or cathode wall 123 and an intermediate or grid wall 125. The output cavity 127 is formed between the intermediate or grid wall 125 and a third or anode wall 129. The input cavity 121 is closed by two fixed parallel walls and two adjustable shorting bars 131. Similar sets of fixed walls and adjustable shorting bars 133 close the output cavity 127.

An anode contacting ring 135 is maintained in insulated relationship to the third or anode wall 129 by dielectric spacers 136 and 137, but is mechanically secured to the anode wall by a hold-down ring 138. The insulating spacers 136 and 137 perform the function of direct current isolation for the high anode voltage and further form a bypass circuit for radio frequencies between the anode contacting ring 135 and the anode wall 129.

A grid terminal contacting ring 139 is carried by a rectangular metallic block 141 which is positioned in the output cavity. The rectangular metallic block 141 has a cylindrical aperture therein in registry with the apertures in the walls 125, 129 to receive the vacuum tube 111 and is secured to the intermediate or grid wall 125 by a pair of oppositely disposed clamps 143, shown in Figs. 7 and 8. The rectangular block 141 is maintained in insulated relationship to the intermediate wall 125 and the clamps 143 by dielectric spacers 145, 147. The insulating dielectric spacers 145, 147 provide for direct current isolation for the grid of the vacuum tube 111 and form a radio frequency bypass circuit between the grid terminal contacting ring 139 and the intermediate grid wall 125.

Figures 6, 7:
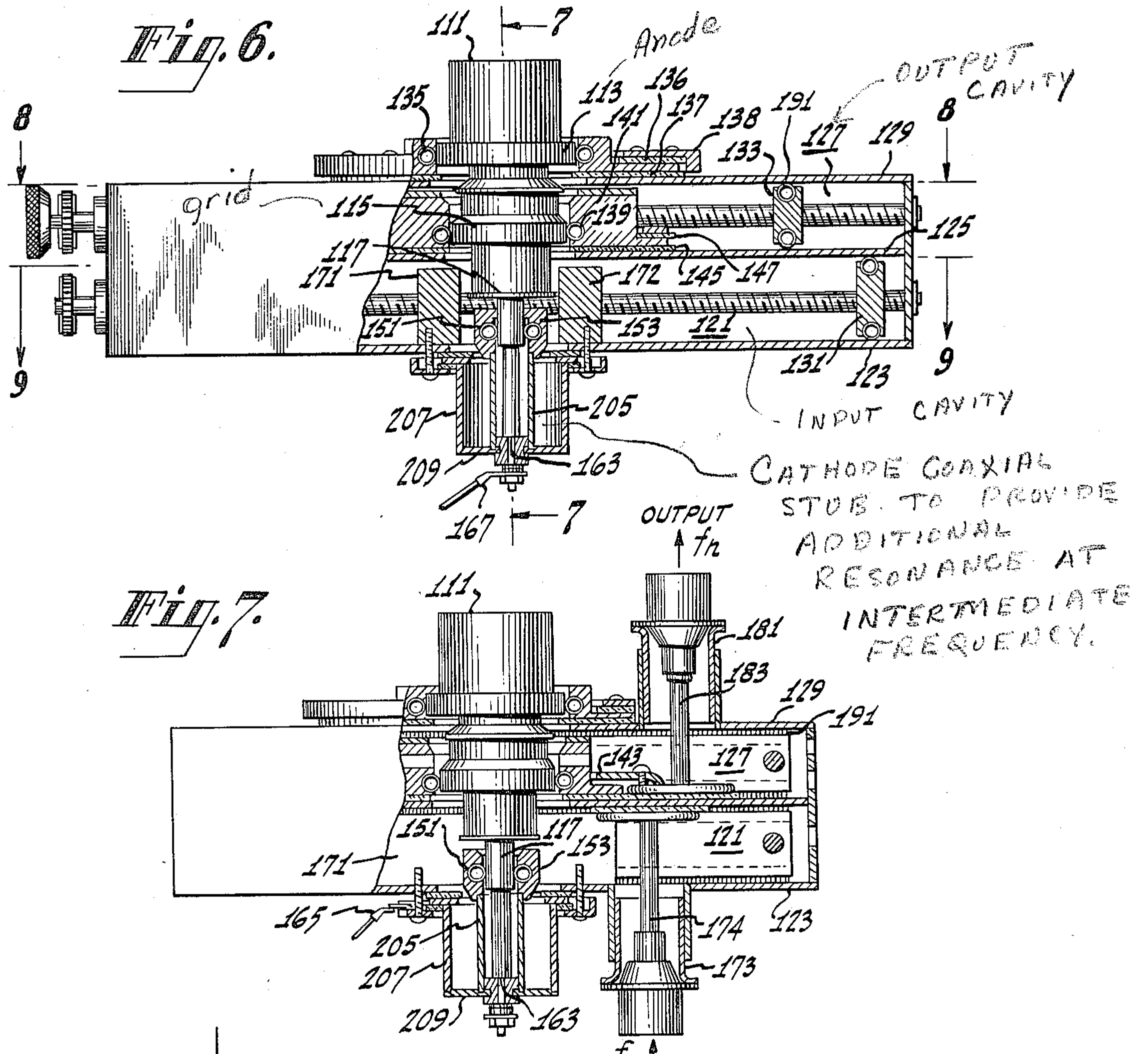
Figs. 6–9 are illustrations of a resonant cavity frequency multiplying structural arrangement according to the invention approximately equivalent to that illustrated in Fig. 4.

The teachings of the aforementioned copending application are modified in the structure according to this invention, in order to provide the additional resonance at the intermediate frequency. This is accomplished by varying the length of the cathode coaxial stub to alter the conditions in the input cavity 121. A longer stub is shown in Figs. 6 and 7. The length of this coaxial stub is more or less inversely proportional to the frequency. A longer stub is required for the lower input frequencies and a shorter stub is required for the higher input frequencies to which the cavity is tunable. The shortened stub is constructed in essentially the same manner as taught in the copending application, except that it is cut down to the desired length for operation in a different manner according to this invention.

For a vacuum tube discharge device 111 having a coaxial cathode and heater terminal arrangement, as shown in Figs. 6 and 7, a cathode terminal contacting ring 151 carried within a cylindrical member 153. For shortened stub construction, the cathode terminal member 153 has an integral flange thereon for mechanically securing the block 153 and cathode terminal contacting ring 151 to the resonator structure as shown in the copending application, the difference being in the stub length. Dielectric spacers are again used to isolate the cathode for direct current potentials but to form a radio frequency bypass circuit between the cathode terminal contacting ring 151 and the first or cathode wall 123.

When the stub is lengthened an additional tubular member 205 is used to extend the cylindrical member 153 and a further tubular member 207 and annular flange or disc member 209 are used to return the outer end of the coaxial stub to the connection point for the lead 165 as shown in both Figs. 6 and 7.

With coaxial type heater-cathode terminals, as shown, the cathode terminal 117 is internally connected within the vacuum tube to one end of the heater filament, and the other end of the heater filament is brought out to a pin contained coaxially with the cylindrical cathode terminal 117. A jack terminal 163 mechanically and electrically engages the heater terminal to supply the heater current to the discharge device 111. A cathode and heater lead 165 (Fig. 7) is electrically connected to the cathode member 153 and a heater lead 167 (Fig. 6) is electrically connected to the heater jack terminal 163.

A pair of metallic blocks 171, 172 are positioned in the input cavity 121 in close proximity to the terminals of the vacuum tube 111. These metallic blocks 171, 172 are connected to the first or cathode wall 123 and effectively form a very low impedance line section between the vacuum tube terminals and the remainder of the input cavity 121. This very low impedance line section formed between the blocks 171, 172 and the adjacent intermediate or grid wall 125 acts to increase the electrical length between the electrodes of the vacuum tube 111 and the shorting bars 131. In the structure according to this invention the spaces between the blocks 171 and 172 and the grid wall 125 are reduced to approximately one-fourth the dimensions taught in the copending application, to aid in producing the desired double resonance condition necessary for operation according to this invention.

Referring now to Fig. 7, which is a cross-section of the same device shown in Fig. 6, taken along the center line thereof in a direction transverse to the view of Fig. 6, there is shown means for coupling radio frequency energy at a frequency $f_1$ into the input cavity 121 and means for deriving radio frequency energy from the output cavity 127 at a frequency $f_n$.

The radio frequency input at the frequency $f_1$ is applied through a short section of coaxial line having a cylindrical outer conductor 173 connected to the first or cathode wall 123 and an inner conductor 174 which extends through an aperture in the first or cathode wall 123 and terminates in a coupling disc 175 (see Fig. 9) in closely spaced capacitive relation to the intermediate or grid wall 125. This input coupling arrangement electrostatically couples the radio frequency energy between the first or cathode wall 123 and the intermediate or grid wall 125.

Figure 8:
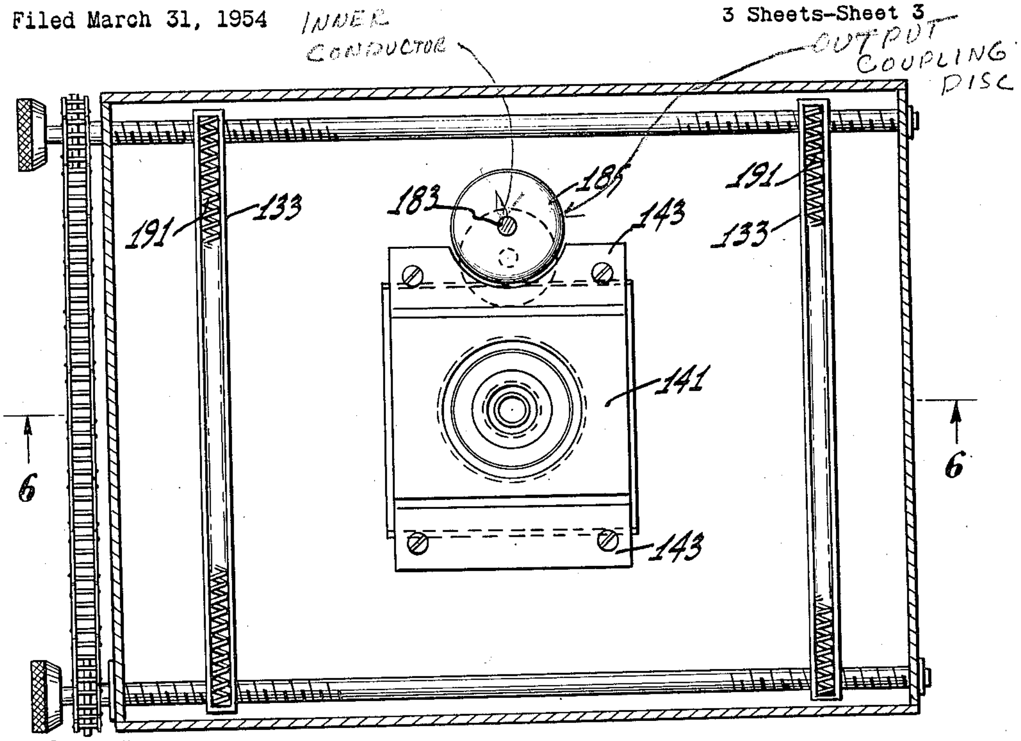

The arrangement for extracting energy at the frequency $f_n$ from the output cavity 127 is similar to the input coupling just described, and includes a coaxial output line 181, 183 having its outer conductor 181 electrically and mechanically connected to the anode wall 129 and its inner conductor 183 terminated in a coupling disc 185 (see Fig. 8).

In Fig. 8, a top plan view of the device of Fig. 11 shows in detail the output cavity 127 with the third or anode wall 129 removed, as indicated by the line 8—8 of Fig. 6. In this figure, the relative positions of the output coupling arrangement, including the coupling disc 185 and the inner conductor 183 of the output line relative to the rectangular metallic block 141, are readily apparent.

Figure 9:
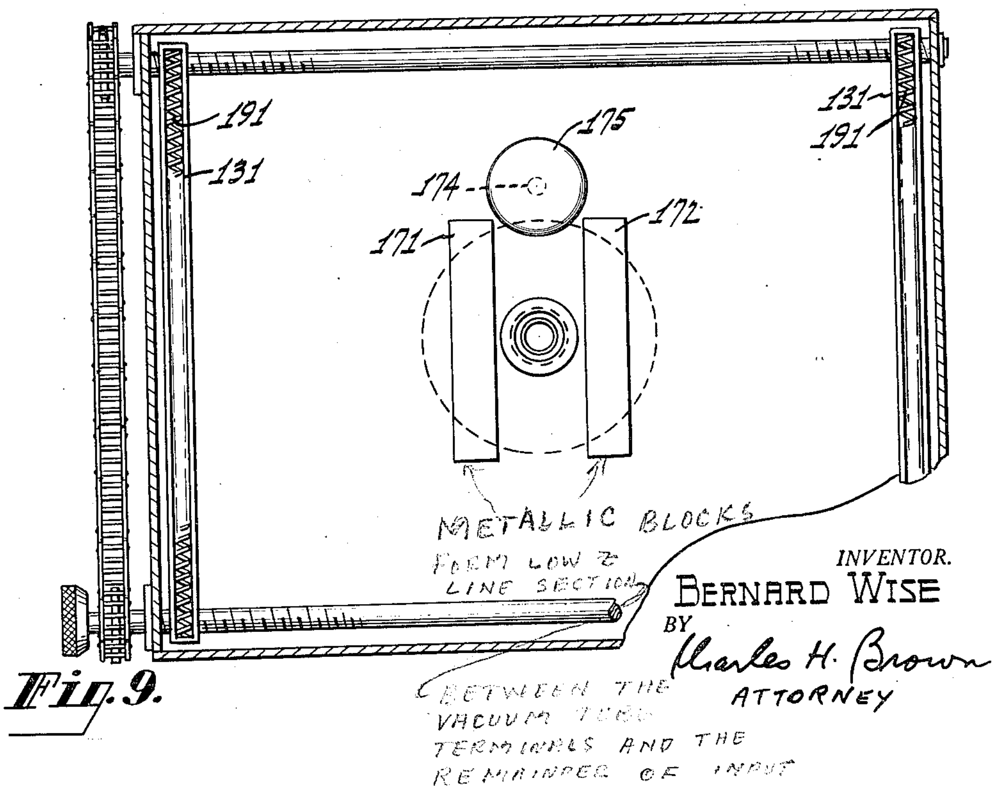

Referring now to Fig. 9, there is shown a plan view of the input cavity 121, as indicated by the line 9—9 of Fig. 6. The relative positions of the input coupling arrangement in plan are shown, including the coupling disc 175 and the inner conductor 174 of the output transmission line.

Figure 10:
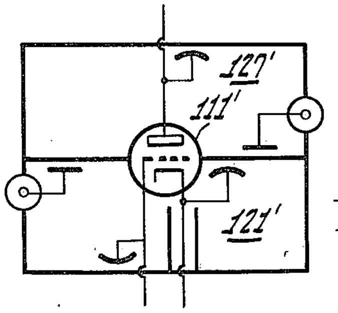
Fig. 10 is a schematic diagram of the structure illustrated in Figs. 6–9.

A schematic diagram of the structure illustrated in Figs. 6–9 is shown in Fig. 10. When the input cavity 121 and output cavity 127 are excited with radio frequency energy, transverse electric waves are set up in the longitudinal direction, that is, between the shorting blocks 131 in the input cavity 121 and between the shorting blocks 133 in the output cavity 127. These longitudinal waves are in the plane of the drawing in Fig. 6 and perpendicular to the plane of the section in Fig. 7. The length of the input cavity 121 is such that from the vacuum tube electrodes inside the vacuum tube 111 to the shorting blocks 131 is one-quarter wavelength for operation over a large portion of the frequency band desired.

The input cavity 121 is also resonant to the intermediate frequency in the form of the three-quarter wave mode. The results of the sub-circuit in the previously described embodiments of Figs. 3 and 4 are effected by the tuning of the cathode blocks 171, 172 and the length of the cathode stub coaxial transmission line. The equivalent operational circuit of the grounded-grid doubler arrangement is shown in Fig. 11. It can be seen that energy at the output frequency is fed back into the input circuit impedance 211 by way of the anode-to-cathode capacitance represented by the capacitor 213. The exact phase of this feedback energy is dependent on the character of the impedance between the grid and cathode at the output frequency. When this latter impedance is capacitive in nature at the output frequency, regenerative feedback is obtained. This is accomplished in the cavity resonator circuit by the series inductance connected between the cathode terminal 117 and the cathode wall 123 in the form of the coaxial stub. Thus the three-quarter wave mode is always resonant to a frequency lower than the output frequency, or a frequency intermediate the input and output frequencies. Care is taken in tuning to see that the magnitude of the feedback never rises to a level that can cause instability.

Starting at the tube electrodes inside the vacuum tube 111, the metallic blocks 171, 172 are outside the first quarter wave point of the standing wave of voltage for the resonant frequency, that is, more than one-quarter, but less than one-half, wavelength at the operating frequency from the vacuum tube electrodes.

In the input cavity 121, the input coupling arrangement consisting of the coaxial line section 173, 174 and the disc 175 couples energy directly into the cavity. Theoretically, this coupling point exists in the cavity at a point at which the resonator is effectively beyond cutoff. However, practically, the input cavity 121 is designed so that the attenuation is not sufficient to prevent setting up the $TE_{10}$ mode in the longitudinal direction and to permit its being propagated in the transverse direction. Therefore, the signal will be developed across the vacuum tube electrodes.

In the output cavity 127, the output coupling arrangement 181, 183, 185 extracts energy from the longitudinal field. This longitudinal field is greatest in close proximity to the rectangular metallic block 141, that is, nearest the vacuum tube terminals. The greatest output coupling could be had by positioning the output coupling arrangement 181, 183, 185 immediately over the rectangular metallic block 141. However, sufficient coupling is achieved at practically all frequencies by the arrangement of Fig. 7. Other workable alternative systems for deriving output waves from the output cavity 127 are described in the above mentioned copending application.

When operating the cavity resonator circuit described as a frequency doubler in conjunction with a concentrically constructed vacuum tube electron discharge device 111, the input cavity 121 between the grid terminal contacting ring 139 and the cathode terminal contacting ring 151 is tuned to resonance at the desired input frequency. For ultra high frequency television transmission, this input frequency will be between 235 and 445 megacycles. The short-circuiting bars 131 are adjusted so that the first quarter-wave point away from the tube electrodes occurs at the short-circuiting bars 131. Stated in another way, the input stage in doubler operation is operated in the $TE_{10}$ mode.

The output stage in doubler operation, that is, the cavity 127 between the control grid contacting ring 139 and the anode contacting ring 135, is tuned to the desired output frequency by positioning the shorting bars 133 at the first quarter-wave point from the tube electrodes. For ultra high frequency television, this frequency will be between 470 and 890 megacycles. Due to the physical and electrical arrangement of the cavity 121, the input circuit in doubler operation will not support a three-quarter wave mode, that is a $TE_{30}$ mode, as an integral multiple of the input frequency. This is due to the fact that, with the dimensions of the cavity and the blocks 171, 172 in the input cavity, the length of the input cavity is not the proper value to support the three-quarter wave mode of operation for any multiple of the input frequency.

One embodiment of the invention successfully operated in practice was designed with the input cavity 121 operable over a range of frequencies from 235 to 445 megacycles and the output cavity 127 operable over a range of frequencies from 470 to 890 megacycles, with the following dimensions. The electron discharge device 111 was a type 6161 ultra high frequency power triode. The first or cathode wall 123, the intermediate or grid wall 125 and the third or anode wall 129 were made of $\frac{3}{32}$ inch silver-plated brass. The spacing between the first or cathode wall 123 and the intermediate or grid wall 125 was $\frac{13}{16}$ inch. The spacing between the intermediate wall 125 and the third or anode wall 129 was $1\frac{1}{16}$ inches. The shorting bars 131 in the input cavity 121 were $\frac{3}{4}$ inch high, $\frac{5}{16}$ inch thick and $7\frac{1}{2}$ inches long, and carried in the channels therein springs 191 of a closely wound helical configuration made of silver-plated Phosphor bronze wire 0.015 inch in diameter, the diameter of the helix being $\frac{1}{4}$ inch. The maximum distance between the shorting bars 131 was $9\frac{1}{4}$ inches, and the minimum distance to which they were adjustable was approximately $2\frac{3}{4}$ inches. The blocks 171 and 172 were also of silver-plated brass and had a length in the longitudinal direction of the cavity of $\frac{1}{2}$ inch, were 3 inches long in the transverse dimension and were roughly $\frac{13}{16}$ inch high, that is, roughly equal to nominal cavity wall spacing. The blocks 171, 172 actually did not touch the intermediate wall 125, but were insulated therefrom by a "teflon" spacing member 0.0100 of an inch thick. This is one-fourth the distance used in the amplifier structure described in the copending application.

The shorting bars 133 in the output cavity 127 had the same thickness and length as the shorting bars 131 in the input cavity, but had a height of 1 inch. The contacting springs 191 in the shorting bars 133 were identical to those used in the input cavity 121. The rectangular metallic block 141 in the output cavity 127 was of silver-plated brass and had a length of 3 inches in the longitudinal direction of the cavity, was $2\frac{1}{4}$ inches wide, $\frac{15}{16}$ inch thick, and included a cylindrical bore $1\frac{1}{2}$ inches in diameter to receive the type 6161 vacuum tube. The spacing between the rectangular block 141 and the anode wall 129 was $\frac{1}{8}$ inch. The anode contacting ring 135 and the grid terminal contacting ring 139 were helical springs identical to those used in the shorting blocks 131 and 133; while the cathode terminal contacting ring 151 was a helix made of the same wire, but having a $\frac{3}{16}$ inch diameter, rather than a $\frac{1}{4}$ inch diameter like the others. The input and output coupling arrangements included short sections of coaxial lines 173, 174 and 181,

183 in which the inner conductors 174, 183 were of silver-plated brass rod 7/32 inch in diameter, and the inside dimension of the outer conductors 173, 181 was 3/4 inch. The discs 175, 185 were each 1 1/4 inch in diameter and 3/32 inch thick. With this arrangement, power gains of 2—3 were obtained over the range of frequencies to which the circuit could be tuned as a doubler.

The invention claimed is:

1. A frequency multiplying circuit arrangement comprising an electron discharge device having at least three electrodes determining input and output terminals, an input circuit coupled to the input terminals to apply a wave of given frequency to said electron discharge device, said input circuit being constructed and arranged to be parallel resonant at said given frequency, an additional impedance coupled to said input circuit to cause such circuit to present a high impedance at a frequency substantially greater than the frequency of said given frequency wave, and an output circuit coupled to the output terminals to derive an output wave having a frequency which is a multiple of said given frequency.

2. A frequency multiplying circuit arrangement as defined in claim 1, wherein said additional impedance is connected to cause said input circuit to be parallel resonant at a frequency near but not equal to the frequency of said output wave.

3. A frequency multiplying circuit arrangement as defined in claim 1 and wherein said input circuit presents a relatively high value of capacitive impedance at a frequency substantially equal to the frequency of said output wave.

4. A frequency multiplying arrangement as defined in claim 1, wherein said high impedance presented is inductive in nature.

5. A frequency multiplying circuit arrangement as defined in claim 1, wherein said input and output circuits and said additional impedance comprise lumped reactance elements.

6. A frequency multiplying circuit arrangement including an electron discharge device having cathode, control and anode electrodes each substantially confined to an individual plane in parallel relationship to the other planes, wall members lying in said planes, and further wall members forming closed volumes in conjunction with the first said wall members, the wall members associated with said control anode electrodes in conjunction with the inter-electrode space forming a cavity resonator circuit tuned to a predetermined frequency, and the remaining wall members associated with said cathode and control electrodes in conjunction with the inter-electrode space forming another cavity resonator circuit tuned to a frequency which is a sub-multiple of said predetermined frequency and presenting a substantially high impedance to energy at said predetermined frequency.

7. A frequency multiplying circuit arrangement as defined in claim 6, wherein said other cavity resonator circuit is parallel resonant at a frequency lying between four and twelve percent below said predetermined frequency.

8. A frequency multiplying circuit arrangement as defined in claim 6, wherein said other cavity resonator circuit incorporates means to load the same to provide resonance at the three-quarter valve mode.

9. A frequency multiplying circuit arrangement as defined in claim 6, wherein a length of coaxial transmission line is connected between the cathode electrode and one wall member of said other cavity resonator circuit.

10. A frequency multiplying circuit arrangement as defined in claim 9, wherein said coaxial transmission line length is of a value at which inductive reactance is presented, at said predetermined frequency, between said cathode and said one wall member of said other cavity resonator circuit.

11. A frequency multiplying circuit arrangement as defined in claim 9, wherein said said coaxial transmission line length is of a value at which capacitive reactance is established across the cathode and control electrodes at said predetermined frequency.

12. A frequency multiplying circuit arrangement comprising an electron discharge device having at least three electrodes determining input and output terminals, an input circuit coupled to the input terminals to apply a wave of given frequency to said electron discharge device, said input circuit being constructed and arranged to be parallel resonant at said given frequency and to present a high impedance at such frequency, an output circuit coupled to the output terminals to derive an output wave having a frequency which is a multiple of said given frequency, and an additional impedance coupled to said input circuit to cause such circuit to present a high capacitive impedance at the output frequency, whereby the phase relations are such that output frequency energy is fed back regeneratively from said output circuit to said input circuit.

13. A frequency multiplying circuit arrangement comprising an electron discharge device having at least three electrodes determining input and output terminals, a cavity resonator input circuit coupled to the input terminals to apply a wave of given frequency to said electron discharge device, said input circuit being constructed and arranged to be parallel resonant at said given frequency, an additional impedance coupled to said input circuit to cause such circuit to present a high impedance at a frequency substantially greater than the frequency of said given frequency wave, and a cavity resonator output circuit coupled to the output terminals to derive an output wave having a frequency which is a multiple of said given frequency.

14. A frequency multiplying circuit arrangement comprising an electron discharge device having at least three electrodes determining input and output terminals, one of said electrodes being a substantially planar control electrode, an input circuit coupled to the input terminals to apply a wave of given frequency to said electron discharge device, said input circuit comprising a cavity resonator having a wall portion lying in the plane of said control electrode and said input circuit being constructed and arranged to be parallel resonant at said given frequency; an additional impedance coupled to said input circuit to cause such circuit to present a high impedance at a frequency substantially greater than the frequency of said given frequency wave, and an output circuit coupled to the output terminals to derive an output wave having a frequency which is a multiple of said given frequency, said output circuit comprising a separate cavity resonator having a wall portion in common with said first-mentioned wall portion.

15. A frequency multiplying circuit arrangement comprising an electron discharge device having at least three electrodes determining input and output terminals, an input circuit coupled to the input terminals to apply a wave of given frequency to said electron discharge device, said input circuit being constructed and arranged to be parallel resonant at said given frequency, an additional impedance coupled to said input circuit to cause such circuit to present a high impedance at a frequency substantially greater than the frequency of said given frequency wave, and an output circuit coupled to the output terminals to derive an output wave having a frequency which is a multiple of said given frequency, said additional impedance causing said input circuit to be parallel resonant at a frequency lying between four and twelve percent below the frequency of said output wave.

References Cited in the file of this patent

UNITED STATES PATENTS

| | | |
|---|---|---|
| 2,407,074 | Green | Sept. 3, 1946 |
| 2,455,824 | Tellier et al. | Dec. 7, 1948 |
| 2,577,454 | Diemer | Dec. 4, 1951 |